United States Patent [19]

Ivers et al.

[11] Patent Number: 4,972,929
[45] Date of Patent: Nov. 27, 1990

[54] BIDIRECTIONAL DUAL DISC VALVE ASSEMBLY

[75] Inventors: Douglas E. Ivers, Cary, N.C.; Leonard J. Schwemmer, Erie, Pa.

[73] Assignee: Lord Corporation, Erie, Pa.

[21] Appl. No.: 362,798

[22] Filed: Jun. 7, 1989

[51] Int. Cl.$^5$ .............................................. F16F 9/34
[52] U.S. Cl. .............................. 188/322.15; 188/317; 188/282; 188/322.22
[58] Field of Search ............... 188/281, 282, 322.15, 188/317, 322.22; 137/493.8, 513.3

[56] References Cited

U.S. PATENT DOCUMENTS

| | | |
|---|---|---|
| 2,060,590 | 11/1936 | Padgett . |
| 2,159,289 | 5/1939 | Nickelsen . |
| 3,199,636 | 8/1965 | De Carbon . |
| 3,256,961 | 8/1964 | De Carbon . |
| 3,312,312 | 4/1967 | De Carbon . |
| 3,430,648 | 3/1969 | Botkin . |
| 3,605,801 | 2/1969 | De Carbon . |
| 3,621,951 | 11/1971 | Schmid . |
| 3,747,714 | 7/1973 | De Carbon . |
| 3,791,407 | 2/1974 | Nicholls . |
| 3,845,782 | 11/1974 | Nicholls et al. . |
| 4,060,155 | 11/1977 | Duckett .......................... 188/317 X |
| 4,088,207 | 5/1978 | Kato ................................ 188/322.15 |
| 4,899,855 | 2/1990 | De Carbon ..................... 188/322.15 |

FOREIGN PATENT DOCUMENTS 1000398 11/1965 United Kingdom .

Primary Examiner—Douglas C. Butler
Attorney, Agent, or Firm—David L. McCombs

[57] ABSTRACT

The bidirectional valve assembly provides for selection of retraction and extension damping characteristics which can accommodate relatively large separation of damping curves. Two cooperable valve discs or ring members are provided which function in unison to resist fluid flow in a first fluid flow direction, while a single one of the valve ring members functions primarily to resist fluid flow in the other direction. In a first embodiment, one of the two cooperable valve ring members comprises a compliant retainer or fulcrum against which the other valve ring member moves in unison therewith to produce relatively low damping in retraction. The other valve ring member moves alone in extension to produce relatively high damping. In an alternative embodiment, the two cooperable valve ring members are superimposed and move in unison during extension, as dictated by their combined stiffness. In retraction, fluid passes through openings in one of the valve ring members for contact with and movement of the other, relatively compliant valve ring member.

7 Claims, 3 Drawing Sheets 4,972,929

BIDIRECTIONAL DUAL DISC VALVE ASSEMBLY

FIELD OF THE INVENTION

The present invention relates generally to fluid flow control valves used in hydraulic shock absorbers and other fluid systems and more particularly provides a uniquely configured bidirectional, dual disc valve assembly of the "floating disc" type.

BACKGROUND OF THE INVENTION

Relatively compact, durable valves for the control of fluid relief flow through the piston of a shock absorber or for use in other hydraulic systems are well known, as exemplified in U.S. Pat. Nos. 3,199,636, 3,256,961 and 3,312,312 issued to de Carbon. So-called "de Carbon valves" constitute a annular disc member predeflected typically between two seating portions of the internal structure of a piston such that relief for fluid flow in one direction occurs at the outer periphery of the disc and relief for opposite flow occurs at the inner periphery thereof. Valve arrangements of this type are designated as floating discs or floating valves since the valve plates or discs are not secured or fixed at any point to the structure. While the flow metering characteristics in one direction as opposed to the other across a singular floating disc can be selected to differ to a certain extent according to the requirements of the desired application, de Carbon and similar valve assemblies possess inherent limitations in this regard. Particularly in vehicle suspension applications having flow metering valve assemblies of the type used in connection with the piston of a shock absorber, for example, ride performance can be optimized where the relationship between force or fluid pressure and velocity or fluid flow rate across the damper (hereinafter described as the "damping curve" or "damping rate") is different in directions of extension and retraction of the suspension system. Extension of the suspension system a defined herein occurs where the movable members interconnected by the damper (such as vehicle frame and body components) are moving away from one another, and retraction of the suspension occurs where the same members are moving towards one another.

More specifically, it is generally desirable to have a higher damping rate in extension than in retraction for vehicle damper applications, and a recognized problem associated with known floating valve arrangements is to obtain a sufficiently high value for the ratio of the extension damping rate relative to the retraction damping rate in the operation of such shock absorbers. While adjustment of parameters such as the inner and outer diameters of the annular floating valve in such assemblies can, to some extent, alter the damping characteristics in each direction of fluid flow, it has been found that selection of the valve ring dimensions alone will not produce satisfactory results for achieving desired high ratios for the two directions of operation.

Various alternative solutions have been proposed for increasing to some extent the ratio between extension and retraction damping rates to provide desired ride characteristics. A common theme has been to structurally modify the assembly to reduce fluid displacement at a selected portion of the valving so as to increase the resistance to the passage of damping liquid during operation in extension. For example, one design entails the provision of a conical, obstructing valve seat surface which permits variable passage of fluid in the extension direction according to the degree of bending of the valve under pressure of the liquid. Other arrangements involve the provision of baffles or spring means to increase the resistance of fluid flow so as to raise the damping curve in extension. While many of such modifications to the valve structure indeed increase the extension-retraction ratio and thus further differentiate or "separate" the damping curves, such is typically not accomplished to a sufficient degree for many performance applications. Prior art devices are therefore substantially limited in their adaptability, affecting ride development and tuning operations. Moreover, known modifications to the relatively simple de Carbon designs suggested by the prior art result in structural complications which are not preferred for operation in constrained environments.

SUMMARY OF THE INVENTION

It is therefore an object of the present invention to provide a bidirectional valve assembly for hydraulic dampers which constitutes an improvement over the prior art valves.

It is a still further object of the present invention to provide a bidirectional valve assembly of the above type in which the fluid flow resistance (and hence the damping rate generally) in extension is relatively high compared to that in retraction.

It is a further object of the present invention to provide a bidirectional valve assembly of the present type in which improved separation of damping curves is experienced in extension relative to retraction.

It is a still further object of the present invention to provide a bidirectional valve assembly of the above type in which two valve ring members are utilized where the compliance of each singly and in combination determines respectively the damping rate in extension and retraction or retraction and extension directions.

Toward the fulfillment of these and other objects, according to the present invention a hydraulic damper assembly is provided having a piston movable within a fluid cylinder. The piston separates and defines upper and lower variable volume chambers within the cylinder. The damping characteristics of the damping assembly are determined by the flow of fluid through the piston between the upper and lower chambers, which is controlled by an improved, bidirectional valve assembly of the present invention. The valve assembly includes two cooperable valve ring members which function primarily in unison to meter fluid flow in a first fluid flow direction, while a single one of the valve ring members functions primarily to meter fluid flow in the other direction. In this manner, both the damping curves in extension of the damper assembly and retraction thereof can be varied independently one from the other.

BRIEF DESCRIPTION OF THE DRAWINGS

For a better understanding of the invention, reference may be made to the following description of exemplary embodiments, taken in conjunction with the figures of the accompanying drawings, in which.

DESCRIPTION OF THE PREFERRED EMBODIMENTS

Figures 1, 2:
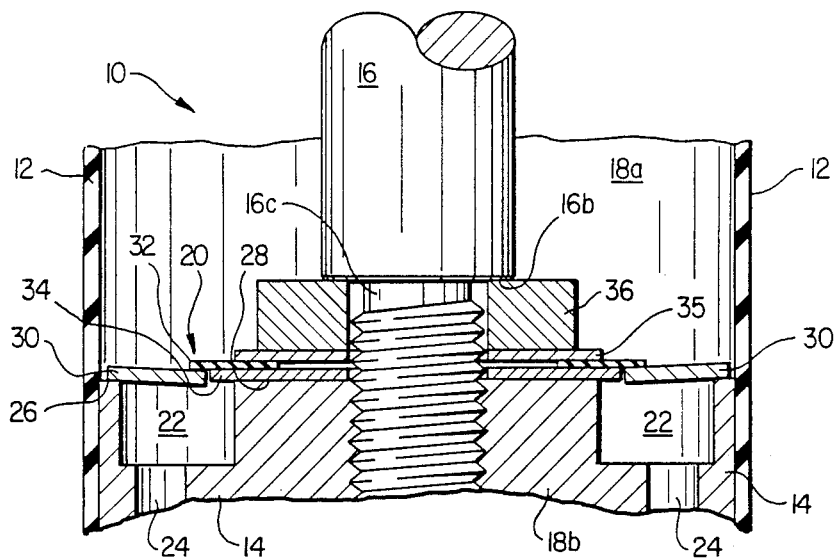
FIG. 1 is a broken away, partial cross sectional view of a damper assembly showing an embodiment of the bidirectional valve assembly of the present invention.
FIG. 2 is a reduced scale, exploded and partially broken away perspective view of the bidirectional valve assembly of the present invention shown in FIG. 1.

Referring to FIG. 1 of the drawings, the reference numeral 10 refers to a hydraulic damper assembly which embodies principles of the present invention and is suitable for use in vehicle suspension systems and for other uses in which it is desirable to control the transmission of energy between spaced members. The damper assembly 10 includes an elongate cylinder 12, a piston 14 located within and movable axially relative to the cylinder 12, and a rod 16 connected to the piston 14 and extending from one end (the upper end, as viewed in FIG. 1) of the cylinder 12. The rod 16 includes a threaded reduced diameter portion 16a for engagement with a threaded bore formed in the piston 14. An annular shoulder 16b is formed on the rod 16 adjacent the reduced diameter portion 16a. Although not shown in the drawing, it is understood that an enclosed chamber is formed in the cylinder 12 which is divided into an upper variable volume chamber 18a and a lower variable volume chamber 18b by the movable piston 14. A suitable "working" fluid, which normally would be hydraulic fluid of a suitable type and viscosity, is contained in each of the upper and lower variable volume chambers 18a, 18b.

The valve assembly of the present invention is shown in general by the reference numeral 20 and operates to regulate the flow of fluid through the piston 14 between the variable volume chambers 18a, 18b to determine the damping characteristics of the system 10 as will be described in detail.

Although not shown in the drawings, it is understood that a distal end of the rod 16 and an end of the cylinder 12 are adaptable to be respectively connected to relatively movable members, such as the frame and body components of a vehicle or the like, between which the transmission of shocks, vibrations and/or some other motions are to be controlled. The arrangement is such that when the relatively movable members interconnected by the damper assembly 10 are moving away from one another, the piston 14 moves generally upwardly (as defined by the drawings) relative to the cylinder 12 (or the cylinder moves downwardly relative to the piston. The assembly 10 is then said to be operating in "extension", such that fluid has a tendency to flow from the upper chamber 18a through the piston 14 and to the lower chamber 18b in response to the resultant pressure differential of fluid in the chambers 18a and 18b. Similarly when the movable members approach each other, the piston 14 moves generally downwardly relative to the cylinder 12 (or the cylinder moves upwardly relative to the piston) and the assembly 10 is said to be operating in "retraction", such that hydraulic fluid has a tendency to flow from the lower chamber 18b through the piston 14 and to the upper chamber 18a in response to the resultant fluid pressure differential.

The valve assembly 20 extends over an annular channel 22 formed in the upper portion of the piston 14 as viewed in FIG. 1. The annular channel 22 registers with a plurality of flow passageways 24 through the piston 14 and allows for communication of hydraulic fluid between the flow passageways 24 and the valve assembly 20. The channel 22 defines at an outer diameter thereof and at a periphery of the piston 14 an annular valve seat 26, and at an inner diameter of the channel 22 an inner annular support surface 28. The annular flow channel 22 and flow passageways 24 may be precast, bored or otherwise formed in the piston.

Referring now to FIGS. 1 and 2, the valve assembly 20 of the present invention includes a relief ring 30 and compliant retainer 32. The relief ring 30 is generally circular and somewhat flexible and overlies the annular channel 22 of the piston 14 to restrict the flow of fluid between the chambers 18a, 18b. The lower surface of the ring 30, at its outer periphery, is normally supported on the valve seat 26. The compliant retainer 32 is likewise a generally circular, flexible ring of a lesser outer diameter than the relief ring 32, which extends over the piston 14 in a coaxial relationship thereto and overlies at its outer periphery an inner diameter region of the relief ring 30. The relief ring 30 is thus of the floating disc type since it is not fixably attached at any point to the piston 14.

A shim member 34 underlies the compliant retainer 32, and is supported on the inner annular support surface 28 for adjusting the elevation of the compliant retainer 32 relative to the relief ring 30. The shim member 34 also centers the relief ring 30 axially relative to the piston 14. A plurality of notches 34a may be included at the periphery of the shim member 34 to enhance fluid flow across the valve assembly. The size and number of the notches 34a may also be used to select the damping curves as discussed later. Alternatively, member 34 may be a raised portion integral with piston 14. A second shim member 35 is supported on the compliant retainer 32. The diameter of shim member 35 can be selected to vary the extent to which it covers the upper surface of the compliant retainer 32. The shim member 35 affects the compliance of compliant retainer 32 as subsequently discussed with reference to FIG. 4C. A retaining ring 36 extends over the upper surface of the shim member 35 to hold the valve assembly 20 in place, and more particularly, secure the compliant retainer 32, the shim member 34 and the shim member 35 against the inner annular support 28. The retaining member 36 is engaged by the shoulder 16b of the piston rod 16 and is thereby held tightly in place by the threaded engagement of the reduced diameter portion 16a of the rod 16 with the bore in the piston 14.

The dimensions of the foregoing elements may be selected and in conjunction with other factors used to model the damping characteristics of the assembly 10 and produce the desired damping curves, as will be described.

Figure 3:
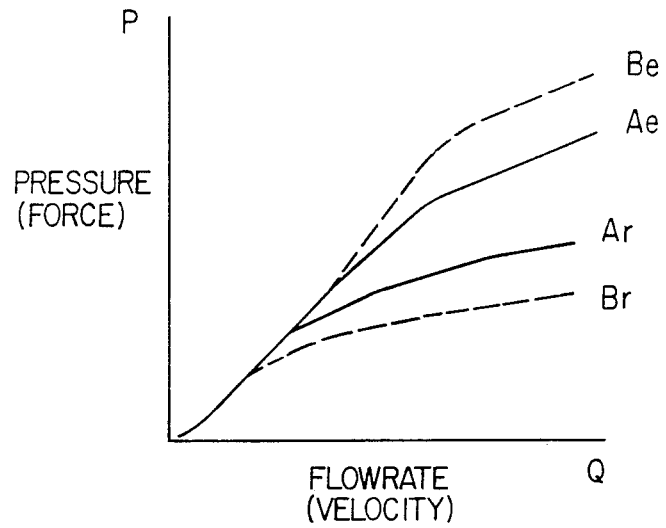
FIG. 3 is a graphical representation of the relationship between fluid pressure (P) and flow rate (Q) for the damper assembly during conditions of extension and retraction.

In operation of the damper assembly 10, the valve assembly 22 of the present invention is bidirectional and provides for selection of fluid damping characteristics in extension and retraction movement of the piston 14. A preference for relatively high damper resistance in extension as compared to that in retraction for vehicle suspension systems and similar applications has been generally established through empirical ride development and other studies. Such preferred damping qualities may be expressed in terms of fluid pressure or force as a function of flow rate or fluid velocity, as shown in FIG. 3, and are characterized by a distinct "separation" of the damping curve in extension ("Ae") from that in retraction ("Ar"). While it is apparent that alternative damping curves, for example, can be provided by either lowering the damping curve in retraction ("Br") and/or raising the damping curve in extension ("Be") to the desired extent (or vice versa), known bidirectional valve arrangements typically cannot independently accommodate a sufficient change in one of the retraction or extension damping curves without also producing a corresponding change in the other damping curve. Accordingly, a typical extension/retraction ratio of 1.1:1 to 1.3:1 for a single floating disc valve of conventional design may be enhanced by the valve assembly 20 to a value in the range of 1.5:1 to 3:1 or greater, for example, depending on the dimensional constraints provided.

Figure 4A:
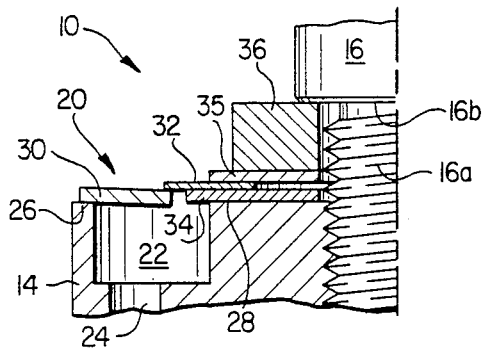
FIGS. 4A, 4B and 4C are broken away radial half section views of the bidirectional valve assembly of FIG. 1 showing operation under static, extension and retraction flow conditions, respectively.
Figure 4B:
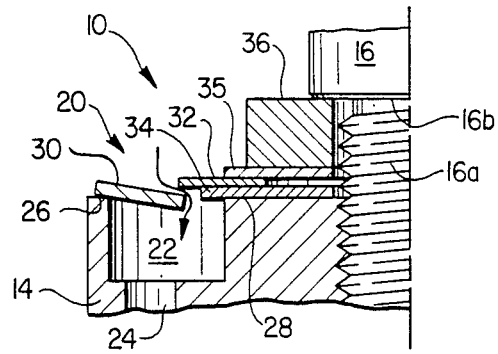
Figure 4C:
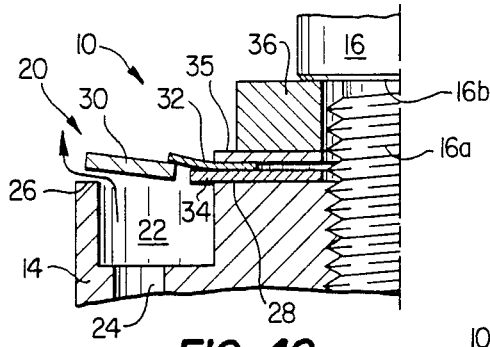

Referring now to FIGS. 4A–4C, operation of the valve assembly 22 under static, extension and retraction conditions are respectively illustrated. As depicted in FIG. 4A, at relatively low fluid pressures between the chambers 18a and 18b, an underside of the relief ring 30 at its outer periphery rests against the valve seat 26 and an upper surface of relief ring 30 about an inner periphery thereof rests against the compliant retainer 32. In this manner, relief ring 30 serves to prevent the flow of fluid in either direction between the chambers 18a, 18b until the fluid forces or pressures (hereinafter fluid pressure differentials) therebetween reach selected values.

In order to ensure the repose position of the valve assembly 20 in FIG. 4A, the relief ring 30 may be applied between the valve seat 26 and the compliant retainer 32 under a slight initial stress or preload. A preload in this manner may be accomplished by the selective positioning of the compliant retainer 32 along the longitudinal axis of the piston 14, which is determined by the thickness of the shim member 34, so as to provide a downward force on the inner periphery of the relief ring 30. When there is an initial preload applied to the relief ring 30, it may center itself automatically under the effect of deformations and sliding contacts which accompany its operation. It is understood that the shim member 34 may also be eliminated altogether by the selection of desirable dimensions of the inner annular support surface 28 in a production version of the assembly 10.

When the damper assembly 10 is operating in extension as shown in FIG. 4B, i.e. with the piston 14 moving upwardly relative to cylinder 12 or the cylinder moving downwardly relative to the piston, fluid flow from the variable volume chamber 18a to the chamber 18b can occur at relatively small fluid flow rates through inevitable "leakage" paths typically present in valve assemblies of this type, or when provided, through designated leakage paths (not shown). At select relatively abrupt fluid pressure differentials, the valve seat 26 of the piston 14 acts as a fulcrum about which the relief ring 30 flexes to permit flow between its inner periphery and the outer periphery of the compliant retainer 32 as shown in FIG. 4B. The deflection of the relief ring permits fluid to pass into the annular channel 24 and fluid flow is thus permitted through the flow passageways 20. Because the relief ring 30 is preferably of substantial rigidity compared to the compliant retainer 32, the resistance to fluid flow and resultant damping will be relatively high.

Operation of the damper assembly 10 at low flow rates under conditions of retraction is illustrated in FIG. 4C, i.e. with the piston moving downwardly relative to cylinder 12, or the cylinder moving upwardly relative to the piston. This will allow for fluid flow from the chamber 18b to the chamber 18a to some extent through "leakage" paths (as discussed above). Under a sufficiently large "pressure drop" or at relatively abrupt fluid pressure differentials, the compliant retainer 32 functions as a movable, flexing fulcrum and the relief ring 30 and the compliant retainer 32 together flex upwardly so as to permit the flow of fluid between the outer periphery of the relief ring 30 and the valve seat 26. The compliant retainer 32 can be used to dominate the selection of damping characteristics in the retraction direction. Because the compliant retainer 32 is typically much more flexible than the relief ring 30, fluid pressure relief in the retraction direction is provided at a much lower value of damping resistance (curve "Br" in FIG. 3) than would otherwise be produced by the flexure of the relief ring 30 alone. The retraction damping curve may therefore be adjusted by changing the thickness and other dimensions of the compliant retainer 32 or the material of which it is constructed.

In addition to adjusting the retraction damping curve by varying the thickness of the compliant retainer 32, the same may be accomplished by the second shim member 35 placed between the retaining member 36 and the compliant retainer 32. Shim member 35 restrains the flexibility of compliant retainer 32 by effectively moving its fulcrum point to an outer edge of the shim member 35. Selection of the diameter of shim member 35 can therefore be used in this manner to adjust the retraction damping curve.

Figure 5:
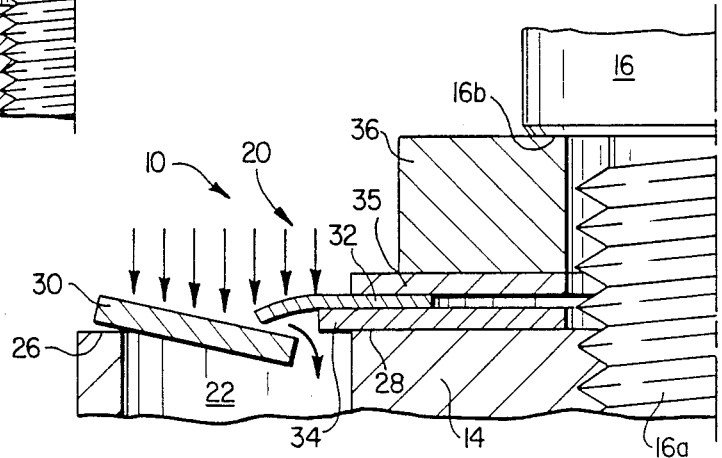
FIG. 5 is an enlarged and broken away radial half section view of the valve assembly of FIG. 1 showing deflection of the compliant retainer during extension for an increased damping rate in extension.

It is understood that the damping rate of the assembly 10 in extension may be additionally elevated to some extent for further separation of the damping curves (FIG. 3) without changing the dimensions of the relief ring 30 or otherwise structurally modifying the piston 14. As shown in FIG. 5, under conditions of extreme fluid pressure differential, the compliant retainer 32 tends to flex downwardly in the direction of the relief ring 30, thereby restricting the fluid flow rate therebetween. In order to prevent the compliant retainer 32 from flexing in extension to such a substantial degree so as to cause "jamming" of the valve assembly 20, or to otherwise select the degree of deflection of the compliant retainer 32 in this direction, the diameter of the shim member 34 may be increased as shown in FIG. 5 to increase the support provided to the underside of compliant retainer 32. As is apparent from the drawings, selection of the diameter of the shim member 34 will not negatively impact the compliance of the compliant retainer 32 in the opposite direction, during retraction The notches 34a of the shim member 34 allow for proper fluid flow between the inner diameter of relief ring 30 and the compliant retainer during operation of the valve assembly 20.

Figure 6:
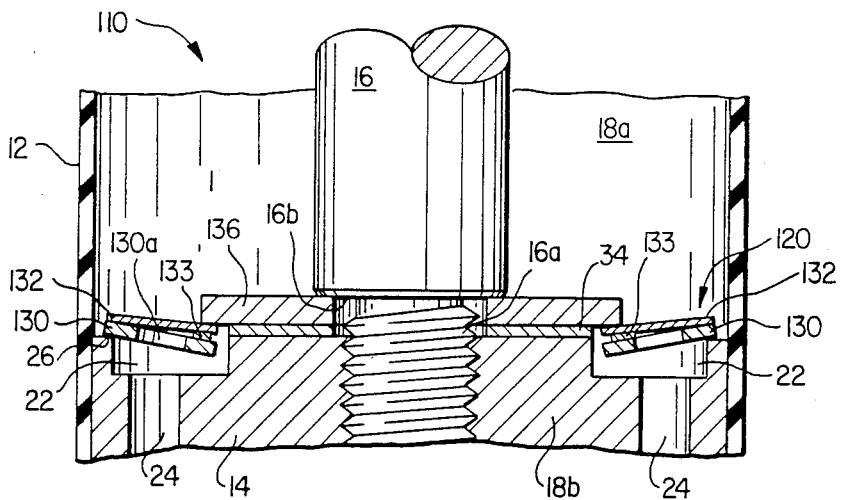
FIG. 6 is a broken away, partial cross sectional view of the damper assembly showing an alternative embodiment of the bidirectional valve assembly of the present invention having superimposed primary and secondary valve ring members.

FIGS. 6 and 7 depict the details of a damper assembly 110 according to an alternate embodiment of the present invention. Since the damper assembly 110 contains many components that are identical to those of the previous embodiment, these components are referred to by the same reference numerals and will not be described in any further detail. According to the embodiment of FIGS. 6 and 7, a valve assembly 120 is provided which includes a primary relief ring 130 and a secondary relief ring 132. The secondary relief ring 132 differs as compared to compliant retainer 32 of the previous embodiment in that it generally possesses the same diameter dimensions as the primary relief ring 130 and functions in overlying relationship therewith as will be subsequently described in detail. Construction of the valve assembly 120 in this manner enables the achievement of similar damping curve selectability and differing damping characteristics between the extension and retraction states, as previously described with reference to the foregoing embodiment.

The primary relief ring 130 is a generally circular, somewhat flexible ring that overlies the annular channel 24 of the piston 14 for metering the flow of fluid between the variable volume chambers 18a, 18b. A plurality of openings or slots 130a extend through the primary relief ring 130 and are spaced between an outer peripheral region and inner peripheral region thereof. The secondary relief ring 132 overlies the primary relief ring 130 and likewise is a generally circular, flexible ring having inner and outer diameter dimensions similar to that of the primary relief ring 130. The ring 132 will typically be somewhat more compliant than the ring 130 since a lower damping rate in retraction is usually preferred (as previously discussed) and is therefore depicted in the drawings as being of relatively reduced thickness. However, it is contemplated that the damping curves in extension and retraction may be otherwise selected and components of the valve assembly in this and the foregoing embodiment altered accordingly.

A spacer member 133 may optionally be placed as shown in FIGS. 6 and 7 between the primary and secondary valve ring members 130, 132, for the purpose of increasing the hydraulic fluid contact surface area on the underside of the ring 132 and for providing means for varying the predeflections of ring members 130, 132. While the spacer member 133 is depicted as an annular ring positioned between the inner peripheral region of the valve ring 130 and an inner peripheral region of the secondary ring 132, it is also contemplated that the spacer member 133 may be positioned between the outer peripheral regions of the primary and secondary valve rings 130, 132. Likewise, the spacer member 133 may be formed as a contiguous portion of either one of the primary and secondary rings 130, 132.

As illustrated in FIG. 6, a retaining member 136 in the damper assembly 110 is of sufficient diameter so as to overhang the annular channel 24 and functions as a rigid fulcrum for the valve assembly 120. The superimposed primary and secondary valve rings 130, 132 are placed over the annular channel 22 so that the lower surface of the outer peripheral region of the ring 130 rests against the valve seat 26. Similarly, the upper surface of the inner peripheral region of the secondary ring 132 rests against an underside of the overhanging portion of the retaining member 136. The superimposed primary and secondary rings 130, 132 may experience an initial stress or preload according to the relative separation along the longitudinal axis of the piston 14 between the valve seat 26 and the retaining member 136, in a manner similar to that described with reference to the previous embodiment. The shim member 34 serves to adjust the position of the retaining member 136 and hence the preload experienced by the valve assembly 120 according to the desired operating parameters.

Figure 7A:
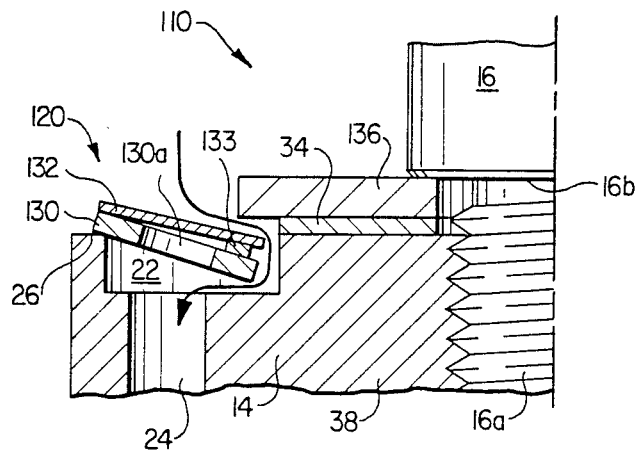
FIGS. 7A and 7B are broken away, radial half section views of the embodiment of the present invention depicted in FIG. 6 showing operation thereof during conditions of extension and retraction, respectively.

Operation of the valve assembly 120 with movement of the piston upwardly in extension is illustrated in FIG. 7A. Under conditions of sufficient fluid pressure differential, the primary and secondary valve rings 130, 132 operate in unison and deflect as shown for passage of fluid into the annular channel 22 and through the flow passageways 24. Since the primary and secondary rings 130, 132 are restrained by the valve seat 26, flexure thereof takes place generally inwardly from this location and is governed by the combined stiffness of the primary and secondary rings 130, 132. In order to faciliate effective fluid flow while maintaining precise gap maintenance for centering purposes for the moving valve assembly 120, the shim member 34 may include a plurality of fluid flow notches as shown in FIG. 2 and described in connection with the previous embodiment.

Figure 7B:
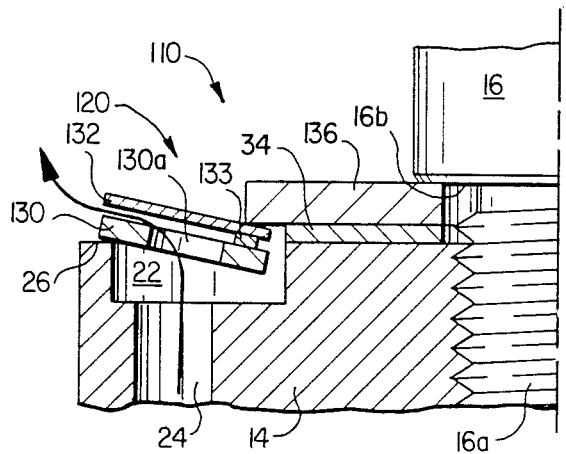

FIG. 7B illustrates the operation of the valve assembly 22 under conditions of movement of the piston 14 relative to the cylinder 12 in retraction. At sufficient fluid pressures, fluid passes through the openings 130a of the primary ring 130, engages the underside of the secondary ring 132, and flexes the outer periphery of the latter member upwardly to allow fluid to pass between the outer peripheral regions of the primary and secondary rings 130, 132. The deflection characteristics of the secondary ring 132 dictate the damping characteristics of the assembly in the retraction direction. In this manner, the damping curves in retraction and extension may be selected and the desired separation of damping curves may be achieved.

In addition to being extremely compact, durable and inexpensive, it will be apparent that the valve assembly of the present invention is extremely versatile in providing independent selection of extension and retraction damping characteristics and can thus accommodate relatively large separation of the damping curves.

Although not specifically illustrated in the drawings, both embodiments of the present invention may be simultaneously included in a single damping assembly. It is also understood that other additional and necessary equipment and structural components will be provided, and that these and all of the components described above are arranged and supported in an appropriate fashion to form a complete and operative system.

It is also understood that variations may be made in the present invention without departing from the spirit and scope of the invention. Although illustrative embodiments of the invention have been shown and described, a latitude of modification, change and substitution is intended in the foregoing disclosure, and in certain instances some features of the invention will be employed without a corresponding use of other features. Accordingly, it is appropriate that the appended claims be construed broadly and in a manner consistent with the scope of the invention.

What is claimed is:

1. A bidirectional fluid control valve assembly for controlling the fluid damping of relative movement between two members, one of which has at least one through opening through which said fluid flows during said relative movement, said valve assembly comprising a retainer ring having outer and inner peripheral portions, the inner portion of which is secured to said one member, a floating valve ring normally covering said opening and having outer and inner peripheral portions, one surface of the outer peripheral portion of said valve ring normally engaging a surface of said one member and the inner peripheral portion of said valve ring normally engaging the outer peripheral portion of said retainer ring, along a surface thereof opposite said one surface, so that, upon movement of said one number relative to said other member in one direction, said retainer ring and said valve ring flex to permit fluid flow through said opening in said one direction at the outer periphery of said valve ring, and upon movement of said one member relative to said other member in a direction opposite said first direction, said valve ring flexes to permit fluid flow through said opening in said opposite direction at the inner periphery of said valve ring, the compliance of said retainer ring being selected so that the fluid flow and resultant damping rate of said relative movement in one direction differs from that of said relative movement in said other direction a predetermined amount.

2. An assembly according to claim 1 further comprising a first shim member supported on said retainer ring with the diameter of said first shim member extending over said retainer ring selected to determine the extent of flexing of said retainer ring during fluid flow in said one direction and thus said damping rate in said one direction.

3. An assembly according to claim 2 further comprising second shim member supported on said one member and underlying said retainer ring with the diameter of said second shim member extending beneath and supporting said retainer ring selected to determine extent of flexing of said retainer ring during fluid flow in said opposite direction and thus said damping rate in said opposite direction.

4. An assembly according to claim 3 wherein said second shim member includes notches at an outer periphery thereof for enhancing fluid flow in said opposite direction at said inner periphery of said valve ring.

5. An assembly according to claim 1 wherein upon movement of said one member in said opposite direction said retainer ring flexes to restrict fluid flow through said opening in said opposite direction at said inner periphery of said valve ring.

6. A bidirectional fluid control valve assembly for controlling the fluid damping of relative movement between two members, one of which has at least one through opening through which said fluid flows during said relative movement, said valve assembly comprising a retainer ring having outer and inner peripheral portions, the inner portion of which is secured to said one member, first and second floating valve rings overlying each other normally covering said opening and having outer and inner peripheral portions, one surface of the inner peripheral portion of said first ring normally engaging the outer peripheral portion of said retainer ring and one surface of the outer peripheral portion of said second ring normally engaging a surface of said one member, said second ring defining a plurality of openings therethrough, so that, upon movement of said one member relative to said other member in one direction, said fluid passes through said openings of said second ring and said first ring flexes to permit fluid flow through said and through opening in said one direction at the outer periphery of said first ring, and upon movement of said one member relative to said other member in a direction opposite said first direction, said first and second rings flex together to permit fluid flow through said opening in said opposite direction at the inner periphery of said first and second rings, the compliance of said first and second rings being selected so that the fluid flow and resulting damping rate of said relative movement in one direction differs from that of said relative movement in said other direction by a predetermined amount.

7. The assembly according to claim 6 further comprising a spacer ring positioned between surfaces of the inner peripheries of said first and second rings for separating said first and second rings to increase the fluid contact surface area therebetween.

* * * * *

UNITED STATES PATENT AND TRADEMARK OFFICE
CERTIFICATE OF CORRECTION

PATENT NO.   : 4,972,929

DATED        : November 27, 1990

INVENTOR(S)  : Ivers et al.

It is certified that error appears in the above-identified patent and that said Letters Patent is hereby corrected as shown below:

Col. 1, line 17, change "a annular disc" to --an annular disc--.

Col. 1, line 39, change "a defined herein" to --as defined herein--.

Col. 3, line 19, change "valve ring members;" to --valve ring members; and,--.

Col. 3, line 68, change "to the piston." to --to the piston).--.

Col. 4, line 5, change "Similarly when" to --Similarly, when--.

Col. 6, line 66, change "during retraction" to --during retraction.--.

Col. 9, line 12, change "number" to --member--.

Signed and Sealed this

Twenty-eighth Day of July, 1992

Attest:

DOUGLAS B. COMER

*Attesting Officer*　　　　*Acting Commissioner of Patents and Trademarks*